United States Patent [19]

Ikeda et al.

[11] Patent Number: 4,725,414
[45] Date of Patent: Feb. 16, 1988

[54] PROCESS FOR PRODUCING GALLIUM-CONTAINING SOLUTION FROM ALUMINUM SMELTING DUST

[75] Inventors: Hidetsuga Ikeda; Shingo Matsui; Akio Era, all of Fukuoka, Japan

[73] Assignee: Mitsui Aluminium Co., Ltd., Tokyo, Japan

[21] Appl. No.: 47,602

[22] Filed: May 7, 1987

Related U.S. Application Data

[63] Continuation of Ser. No. 806,734, Dec. 9, 1985, abandoned.

[51] Int. Cl.$^4$ .............................................. C01G 15/00
[52] U.S. Cl. ................................... 423/111; 423/132; 75/25; 75/63; 75/101 R; 75/114; 75/115; 75/121
[58] Field of Search ................. 75/25, 63, 101 R, 114, 75/115, 121; 423/111, 132

[56] References Cited

U.S. PATENT DOCUMENTS 4,252,777  2/1981  McDowell et al. ................. 423/132

FOREIGN PATENT DOCUMENTS 1527981  10/1978  United Kingdom ................. 423/111

Primary Examiner—Robert L. Stoll
Attorney, Agent, or Firm—Jordan and Hamburg

[57] ABSTRACT

5 to 50 wt. % of an alkaline flux such as sodium carbonate, sodium hydroxide, potassium carbonate and potassium hydroxide is added and mixed to aluminum smelting dust. The mixture is roasted, the roasted mixture is acid-leached with mineral acids such as sulfuric acid, hydrochloric acid and nitric acid, and then gallium is preferentially extracted at a high yield compared to other components of the dust.

6 Claims, 1 Drawing Figure

PROCESS FOR PRODUCING GALLIUM-CONTAINING SOLUTION FROM ALUMINUM SMELTING DUST

This application is a continuation of application Ser. No. 806,734 filed Dec. 9, 1985, now abandoned.

BACKGROUND OF THE INVENTION

The present invention relates to a process for producing a gallium-containing solution having a high concentration of a gallium component from aluminum smelting dust.

Gallium is noted as a raw material for semi-conductors such as gallium-arsenic(GaAs) or gallium-phosphorus(GaP) in recent year.

Gallium is widely distributed all over the earth, but does not exist as highly concentrated ore. Therefore, gallium is presently obtained by the following processes:

(i) Gallium is recovered from Bayer liquor which is a highly concentrated alkaline solution dissolving Al(OH)$_3$. An electrochemical reduction process with a mercury cathode or a solvent extraction process is used for recovering gallium from the Bayer liquor.

The solvent extraction process developed by Rhone Poulenc Co. using Kelex 100(trademark of alkylated-8-hydroxy-quinoline)is well-known (See pages 439–442, Vol. 2. 1979, Proceeding of the International Solvent Extraction Conference and French Patent No. 7629009).

(ii) Gallium is recovered from aluminum smelting dust by flotation(Japanese Patent Publication No. SHO59-111919, June 28, 1984) or alkaline roasting(See British Patent No. 1527981).

(iii) Gallium is recovered from the residue of the zinc leach solution in a zinc smelting process, in which the residue is leached with sulfuric acid. Gallium is recovered by an extracting agent such as versatic acid or isopropyl ether(See pages 65–76, Proceeding of Fourth Joint Meeting MMIJ-AIME 1980, Tokyo).

Though gallium is recovered from the residue of a zinc leach solution (iii) in Japan, the major source of gallium is bauxite which is the raw material for making aluminum. However, the efficiency of recovering gallium directly from bauxite is low,for the gallium content in bauxite is as low as 50–100 p.p.m.

The process for recovering gallium from Bayer liquor is mentioned in process (i) above. Electrochemical reduction with a mercury cathode creates an environmental pollution problem because of the mercury. The solvent extraction process also has problems such as deterioration of the expensive extracting agent, loss by the decomposition and the suspension and contamination of the Bayer liquor itself with organics, because the Bayer liquor is highly caustic.

The complicated processes and expensive treating costs are required in process(i) because of the very low gallium content. Accordingly, aluminum smelting dust having a comparatively high gallium content is preferable as the raw material. Gallium contained in Bayer liquor exhibits the same behavior as aluminum. Almost all the gallium goes into alumina. The gallium concentration in alumina depends on ghe gallium content in the bauxite, which is usually 30 p.p.m.–100 p.p.m. Gallium in the dust created during the electrolysis by using alumina is highly concentrated to 800 p.p.m.–3000 p.p.m. The general composition of dust evolved from an aluminum electrolysis process is 0.08–0.30 wt.% of gallium, 0.5–2.0 wt.% of iron, 10–20 wt.% of aluminum, 10–20 wt.% of sodium, 10–30 wt.% of flourine, 10–30 wt.% of carbon and less than 1 wt.% of silicon, nickel, titanium, calcium, copper, magnesium, cobalt and vanadium.

British Patent No. 1527981 relates to treatment of the aluminum smelting dust, which contains 0.2% gallium at the most.

The process consists of roasting the dust at a temperature of 500°–800° C., after adding alkaline flux in a large excess (5 times of the dust weight, for example), followed by leaching the roasted mixture of dust and flux with water, and then precipitating the dissolved gallium by adding base metal powder (aluminum or magnesium) into the leach liquor.

However, the above-mentioned process has a practical limitation, because iron, aluminum etc. are also extracted with gallium at the same time, and expensive alkaline flux has to be added in an amount greater than the amount of dust for roasting. The cost of the alkaline flux may exceed the price of the gallium to be recovered.

SUMMARY OF THE INVENTION

It is an object of the present invention to provide a process for preferentially leaching gallium from aluminum smelting dust.

It is another object of the present invention to provide a practical process, in which a small amount of alkaline flux is used in the process for producing a gallium-containing solution.

These objects are achieved by adding 5–50 wt. % of alkaline flux to aluminum smelting dust, then roasting the dust-flux mixture at 500°–900° C., and then acid-leaching the roasted mixture with mineral acids.

DETAILED DESCRIPTION OF THE PREFERRED EMBODIMENTS

Figure 1:
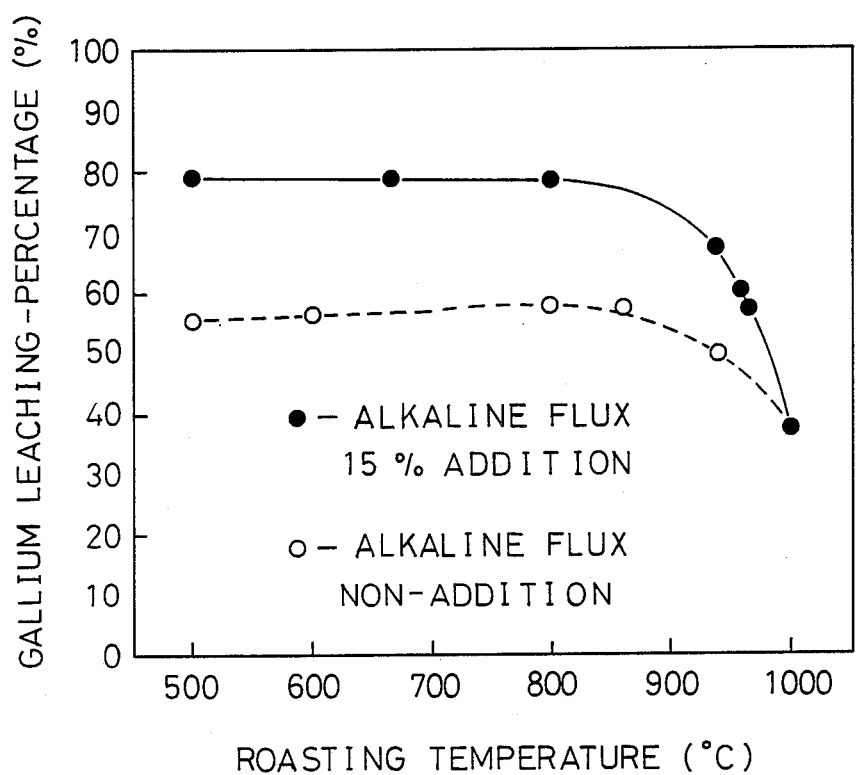
FIG. 1 shows the relation of the roasting temperature and the leaching percentage of gallium by using sodium carbonate as an alkaline flux.

The present invention is a process for obtaining an aqueous solution containing gallium from aluminum smelting dust, in which gallium is concentrated to 0.08–0.30 wt. %. The process is achieved by adding 5–50 wt % of an alkaline flux to aluminum smelting dust, then roasting the dust-flux mixture at 500°–900° C., and then acid-leaching the roasted mixture using mineral acids.

The alkaline flux is selected from the group consisting of sodium carbonate, sodium hydroxide, potassium carbonate, potassium hydroxide and mixtures thereof. The extraction of gallium cannot be improved when the alkaline flux is less than 5 wt. %, as sintering proceeds during roasting. More than 50 wt. % of alkaline flux is objectionable, though the extraction of gallium can be improved slightly. The amount of acid required at the time of leaching in the following process increased, resulting in the increase in costs of alkaline flux and acid.

Practically, alkaline flux in the range of 10 to 30 wt. % of dust is preferable.

It is considered that the roasting of the mixture of dust and alkaline flux is a kind of alkali fusion. It is also considered that the insoluble gallium fluoride changes into oxide by decomposing, and then reacts with alkali, forming soluble sodium gallate or potassium gallate.

The roasting temperature has to be controlled between 500° and 900° C. Roasting does not proceed below 500° C. On the other hand, roasting above 900° C. also gives a low extraction of gallium. When roasting is carried out above 900° C., the fusion of dust-flux mixture takes place, forming an insoluble glassy substance.

Therefore, the control of temperature during roasting is required. The range of 600°–800° C., in which roasting proceeds with a reasonable speed, while sintering hardly occurs, is preferable.

The roasted mixture is leached with mineral acids. Any of sulfuric acid, hydrochloric acid and nitric acid can be used for the mineral acids. The acid-leaching is done at 80°–100° C. It takes a long time to extract gallium, when leaching is performed at a temperature below 80° C. Elevation of temperature over 100° C. is also impractical because of the increased energy for heating.

Over 70% of gallium in the roasted mixture is extracted by acid-leaching. The leach slurry is filtered to separate the solution from the insoluble material, and the gallium-containing solution is obtained.

Gallium metal is obtained by a suitable process from the gallium-containing solution. The following operation is an example:

The gallium-containing solution is first neutralized with alkali, and gallium hydroxide is produced at pH 4–5.

Secondly, the obtained slurry is filtered, and the recovered hydroxide is dissolved with hydrochloric acid.

The gallium is purified in a suitable way such as an ether extraction, in which gallium is extracted in the ether while other metal impurities remain in the aqueous solution. The gallium loaded on the ether is stripped with water, and the aqueous solution containing gallium is obtained. The solution is then hydrolyzed to precipitate gallium hydroxide. The hydroxide is dissolved in a strong sodium hydroxide solution, and then the solution is electrolyzed to obtain high purity gallium metal.

For a better understanding of the present invention, some examples illustrating the process of recovery of gallium are given hereinbelow.

EXAMPLE 1

Ten(10) Kg of aluminum smelting dust, which was collected in an electric precipitator attached to aluminum reduction cells, was mixed with 1.5 Kg of sodium carbonate and 3 Kg of water. The gallium concentration in the dust was 0.144 wt. %. The mixture was ground after drying. Two(2) Kg of the ground mixture, the partical size of which was from 0.74 to 4.3mm, was put into a horizontal rotary kiln and was roasted using an LPG burner. The temperature of mixture for the roasting was kept at 800° C. for about 3 hours.

The amount of the obtained roasted mixture was 1.7 Kg, and the gallium concentration was 0.145 wt. %. Loss of gallium during roasting was not observed. The roasted mixture was ground, and then 5.7l of water was added to make a slurry.

Next, 1.0 Kg of sulfuric acid(purity 98%) was added to the slurry. The slurry was stirred at 95°–100° C. for 3 hours, filtered and washed. Five-point-seven (5.7)l of gallium-containing solution having 350 p.p.m. of gallium was obtained as the filtrate. Eighty-one(81) % of gallium in the roasted mixture was extracted in the obtained solution.

CONTROL EXPERIMENT 1

A gallium-containing solution was obtained by the same process without adding sodium carbonate to the dust in Example 1.

The recovery of gallium was 57%.

EXAMPLE 2

Ten (10) Kg of aluminum smelting dust, which is collected in an electric precipitator attached to aluminum reduction cells, was mixed with 1.5 Kg of sodium carbonate. The gallium concentration in the dust was 0.19 wt. %. The mixture was kneaded with water and then ground after drying. Two(2) Kg of the ground mixture, the particle size of which was from 0.74 to 4.3 mm, was put into a horizontal rotary kiln and was roasted using an LPG burner. The roasting temperature was kept at 920° C. for about 3 hours.

The amount of the obtained roasted mixture was 1.8 Kg, and the gallium concentration was 0.19 wt. %. The fuming loss of gallium during roasting was not observed. The roasted mixture was ground, and then 6 l of water was added to the ground mixture to make a slurry.

Next, 1.1 Kg of sulfuric acid(purity 98%) was added to the slurry. The slurry was stirred at 95°–100° C. for 3 hours, filtered and washed. Six(6)l of gallium-containing solution having 390 p.p.m. of gallium was obtained as filtrate. Sixty-eight(68) % of gallium in the roasted mixture was extracted in the solution.

CONTROL EXPERIMENT 2

A gallium-containing solution was obtained by the same process without adding sodium carbonate to the dust in Example 2.

The recovery of gallium was 49%.

The relationship between the roasting temperature and gallium extraction in the sulfuric acid leaching of the roasted dust is shown in FIG. 1, in connection with the addition of sodium carbonate as an alkaline flux.

It is evident from FIG. 1, and the comparison between Example 1 and Control Experiment 1, and Example 2 and Control Experiment 2, that the addition of alkaline flux gives a high extraction of gallium from aluminum smelting dust.

The present invention also has excellent practicality because the addition of such a small amount of alkaline flux as 5–50 wt. % to the dust yields desired results.

What we claim is:

1. A process for producing a gallium-containing solution from aluminum smelting dust comprising mixing aluminum smelting dust with 5 to 50% by weight of an alkaline flux selected from the group consisting of sodium carbonate, sodium hydroxide, potassium carbonate, potassium hydroxide and mixtures thereof, heating the mixture to a temperature sufficient to roast the mixture without fusing the mixture, leaching the roasted mixture at a temperature of 80° C. to 100° C. with a mineral acid selected from the group consisting of sulfuric acid, hydrochloric acid, nitric acid and mixtures thereof to preferentially solubilize gallium from other material in the roasted mixture, and filtering the leached mixture to separate the solubilized gallium solution therefrom.

2. A process for producing a gallium-containing solution from aluminum smelting dust according to claim 1, wherein the mixutre is heated at a temperature ranging from 500° C. to 900° C.

3. A process for producing a gallium-containing solution from aluminum smelting dust according to claim 2, wherein the mixutre is heated at a temperature ranging from 600° C. to 800° C.

4. A process for producing a gallium-containing solution from aluminum smelting dust according to claim 1, wherein the aluminum smelting dust is mixed with 10 to 30% by weight of said alkaline flux.

5. A process for producing a gallium-containing solution from aluminum smelting dust according to claim 1, wherein the aluminum smelting dust contains from 0.08 to 0.30% by weight gallium.

6. A process for producing a gallium-containing solution from aluminum smelting dust according to claim 1, wherein the aluminum smelting dust contains, by weight, 0.08 to 0.30% gallium, 0.5 to 2.0% iron, 10 to 20% aluminum, 10 to 20% sodium, 10 to 30% fluorine, 10 to 30% carbon, and less than 1% silicon, nickel, titanium, calcium, copper, magnesium, cobalt and vanadium.

* * * * *